2,796,448

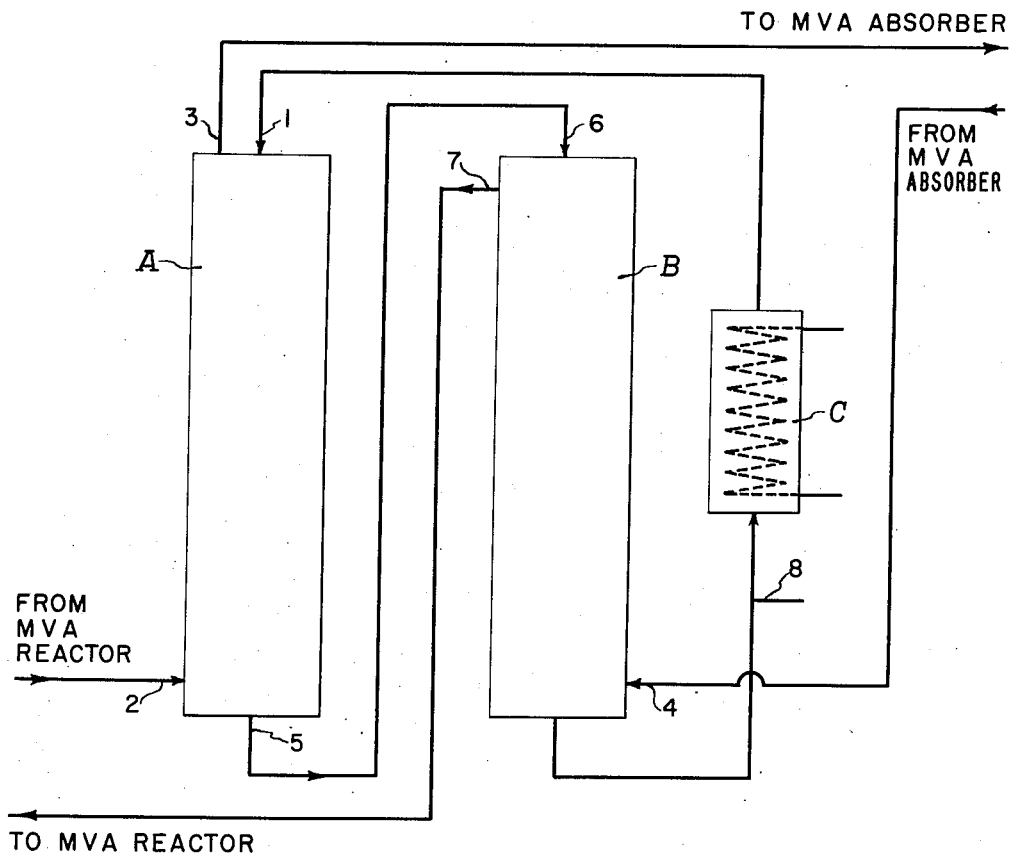

CONDITIONING OF GASES

Albert B. Root 3rd, Louisville, Ky., assignor to E. I. du Pont de Nemours and Company, Wilmington, Del., a corporation of Delaware Application April 19, 1955, Serial No. 502,377

2 Claims. (Cl. 260—678)

This invention relates to the conditioning of gases, and more particularly to a process for the manufacture of monovinyl acetylene in which the mixed gases coming from the monovinyl acetylene reactor are conditioned prior to separation, while at the same time the unreacted acetylene removed during the separation of the gases is reconditioned to be again circulated to the monovinyl acetylene reactor.

Monovinyl acetylene, a valuable intermediate used in the manufacture of 2-chloro-1,3-butadiene, is normally produced by the polymerization of acetylene in the presence of an aqueous cuprous chloride catalyst. When this process is carried out in a continuous manner, the polymerization of acetylene in the presence of the catalyst is carried out under conditions giving a low conversion rate to prevent the formation of higher and undesirable polymers. In this process it is therefore necessary to remove the monovinyl acetylene from the acetylene stream as it comes from the monovinyl acetylene reactor, and condition the unreacted acetylene so that it can again be used in the monovinyl acetylene process. The monovinyl acetylene may be removed from the gas stream by fractional condensation as more particularly described in U. S. Patent 2,048,838 to Carter and Downing, or by absorption in solvents.

The mixture of acetylene, monovinyl acetylene and other products of the polymerization reaction as it comes from the monovinyl acetylene reactor is warm and contains considerable water vapor. If this gas is introduced directly into the apparatus employed for the condensation or absorption of the monovinyl acetylene, it not only increases the refrigeration load of the apparatus but makes it less effective in the separation process. Also, in the absorption of the monovinyl acetylene in the separation process, the acetylene comes from the absorption column in a relatively dry state and at a relatively low temperature. Since it is desirable to have a certain amount of moisture present in the acetylene stream which passes into the monovinyl acetylene reactor to prevent the removal of water from the catalyst, and since it is undesirable that the acetylene be introduced at too low a temperature since at low temperatures it tends to cause crystallization of the saturated catalyst solution with attendant plugging of equipment, it is desirable that this acetylene be conditioned to a proper moisture content and at the same time bring it to a proper temperature.

It is an object of the present invention to provide a process for conditioning the gases which come from the monovinyl acetylene reactor in the preparation of monovinyl acetylene from acetylene so that the monovinyl acetylene may be separated by condensation or extraction with solvents, and at the same time conditioning the acetylene which is subsequently separated from the gas mixture so that it will operate satisfactorily in the monovinyl acetylene reactor.

The process of the present invention provides a simple and economical method for conditioning both the mixed gases which are emitted from the monovinyl acetylene reactor and the acetylene which is finally separated from such mixture to be returned to the monovinyl acetylene reactor when the process is carried out in a continuous manner. According to this process, an inert aqueous inorganic salt solution, which does not react with acetylene, monovinyl acetylene or the organic solvent which is to be used in the absorption of the monovinyl acetylene from the gas mixture, is refrigerated to a temperature of about —5° C. or below, and the mixed gases from the monovinyl acetylene reactor containing in the main acetylene, monovinyl acetylene and water vapor with lesser amounts of by-products of the reaction, are passed counter-current to this cooled inorganic salt solution, resulting in the condensation of the moisture that is carried in the mixed gases, and cooling the mixed gases to a point where they can be passed directly into the monovinyl acetylene absorber in which a solvent for the monovinyl acetylene is used at relatively low temperatures. A relatively concentrated salt solution is employed so that temperatures of —5° C. or lower may be employed in removing the water content of the wet gas, and so that the solubility of the monovinyl acetylene in such solution may be kept at a minimum. Calcium chloride is particularly suitable, although other salts such as sodium chloride, magnesium sulfate, potassium nitrate, etc., may be employed.

The salt solution pumped from the bottom of the cooling column is then introduced at the top of a second column into which dry acetylene, which is being returned from the monovinyl acetylene absorber, flows upwardly against the flow of the somewhat warm salt solution. The temperatures of the solution are maintained at a point where the proper amount of moisture is again absorbed by the acetylene, thereby conditioning it both as to temperature and moisture content to be returned to the monovinyl acetylene reactor.

In the attached drawing which forms a part of the present application, a flow diagram is given to illustrate a preferred method for carrying out the process of this invention. The columns employed may be the conventional gas scrubbing columns packed with Raschig rings, and the heat exchanger is one through which refrigerated brine solution may be circulated to maintain the brine used for scrubbing at a proper temperature.

The following example is given to specifically illustrate a preferred method for carrying out the invention.

Example

In the accompanying drawing, the conditioning equipment used in carrying out the process of the present invention comprises two scrubbing columns A and B and heat exchanger C. A 25% calcium chloride brine solution, maintained at about —5° C. by passing through the heat exchanger C in which a second brine solution maintained at about —19° C. is circulated, is introduced at 1 into the top of column A and flows downwardly over the Raschig rings with which the columns are packed. The mixed acetylene, monovinyl acetylene and by-product gases from the monovinyl acetylene reactor, containing by weight 188 parts of acetylene, 30.2 parts of monovinyl acetylene, 2.32 parts of water and about 5 parts of various by-products, are introduced at the rate of 237 parts by weight per hour at 2 into the bottom of colum A at a temperature of about 35° C. and at about 35 pounds per square inch gauge pressure. The gases flow upwardly through the column A countercurrent to the calcium chloride brine solution and are removed from the top of the column at 3 at approximately —2° C. Due to this cooling, the water content of the gas leaving the column is reduced to 0.2 part. This gas is then passed directly from the column A to the monovinyl acetylene absorber (not part of the present invention), where the monovinyl acetylene and by-products are removed with cold acetone or other solvent.

The separated acetylene from the monovinyl acetylene absorber containing approximately 188 parts of acetylene and only 0.02 part of water, 0.2 part of monovinyl acetylene and less than 2 parts of by-products, is returned at a temperature of about —5° C. from the monovinyl acetylene absorber and introduced into the bottom of column B at 4 at the rate of about 200 parts by weight per hour. The gases pass upwardly counter-current to the calcium chloride brine solution pumped from the bottom of column A at 5 to the top of column B at 6, where it enters column B at a temperature of about 20° C. The acetylene stream leaves the top of column B at 7 at a temperature of about 17° C., whereby it is humidified to a water content of 1.1 parts and is sufficiently warmed to be recycled to the monovinyl acetylene reactor.

In some cases the temperatures of the calcium chloride brine solution and the gases being treated may be exactly balanced so that the water and heat removed in the one column are equal to that added in the other. Ordinarily, however, there will be some gain or loss which will be made up, preferably by warming or cooling the calcium chloride brine on passing through the heat exchanger C. This will depend upon the concentration of the calcium chloride or other salt solution used and the temperatures and pressures employed, as will be apparent to those skilled in the art. Provision may be made at 8 for adding or removing the salt solution. The monovinyl acetylene-acetylene mixtures leave the top of column A cooled and dried, while the acetylene return-from from the monovinyl acetylene absorber leaves the top of column B warmed and humidified. The particular temperatures at which the process is operated will depend upon the temperature required in the monovinyl acetylene reactor and the temperature required in the monovinyl acetylene absorbing system, respectively. The monovinyl acetylene-acetylene mixture as it enters the first column may be between 30° and 80° C., and the acetylene entering the second column after the removal of the monovinyl acetylene by the solvent extraction may be at a low temperature of between —25° C. and +20° C. The pressure may be likewise varied to the pressures used in the related operations. Usually pressures of from 5 to 75 pounds gauge will be employed.

I claim:

1. In a continuous process of manufacturing monovinyl acetylene from acetylene in which a low conversion of the acetylene to monovinyl acetylene for each pass through the catalyst employed makes it desirable to recirculate the unreacted acetylene, the steps which comprise conditioning the stream of mixed gases containing the acetylene and monovinyl acetylene by passing the gas stream counter-current to a cooled aqueous inorganic salt solution whereby the moisture in the mixed gases is substantially entirely removed, and then passing the somewhat diluted aqueous salt solution counter-current to the returning acetylene stream which has been freed from monovinyl acetylene whereby the acetylene stream is simultaneously warmed and humidified for return to the monovinyl acetylene reactor, and maintaining the aqueous salt solution at a temperature whereby it will extract moisture from the monovinyl acetylene-acetylene gas mixture and thereafter give up moisture to the returning acetylene stream.

2. In a continuous process of manufacturing monovinyl acetylene from acetylene in which a low conversion of the acetylene to monovinyl acetylene for each pass through the catalyst employed makes it desirable to recirculate the unreacted acetylene, the steps which comprise conditioning the stream of mixed gases containing the acetylene and monovinyl acetylene by passing the gas stream through a gas scrubbing column counter-current to an approximately 25% calcium chloride solution cooled to about —5° C. whereby the mixed gases are cooled and the moisture is substantially entirely removed, circulating the resulting somewhat warmed calcium chloride solution as it comes from the first scrubbing column to the top of a second gas scrubbing column counter-current to a dried stream of acetylene from which the monovinyl acetylene has been separated and which has been cooled to about —5° C., and recirculating the acetylene from the top of said second column which has been warmed and humidified by the calcium chloride solution to the monovinyl acetylene reactor.

References Cited in the file of this patent

UNITED STATES PATENTS

| | | |
|---|---|---|
| 2,048,838 | Carter et al. | July 28, 1936 |
| 2,191,088 | Stadler et al. | Feb. 20, 1940 |
| 2,232,839 | Carter | Feb. 25, 1941 |